United States Patent
Philosof et al.

(10) Patent No.: US 10,026,314 B1
(45) Date of Patent: Jul. 17, 2018

(54) MULTI-VEHICLE SENSOR SHARING

(71) Applicant: GM Global Technology Operations LLC, Detroit, MI (US)

(72) Inventors: Tal Philosof, Givatayim (IL); Eilon Riess, Zikron-Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/410,023

(22) Filed: Jan. 19, 2017

(51) Int. Cl.
*G08G 1/00* (2006.01)
*G08G 1/137* (2006.01)
*G08G 1/16* (2006.01)
*H04L 29/08* (2006.01)

(52) U.S. Cl.
CPC ............. *G08G 1/137* (2013.01); *G08G 1/161* (2013.01); *G08G 1/164* (2013.01); *H04L 67/12* (2013.01)

(58) Field of Classification Search
CPC .. H04N 7/181; G08G 1/161; G08G 1/096791; G08G 1/096775; G08G 1/0967; G08G 1/096766; G08G 1/137; G08G 1/164
USPC ......... 340/901, 905; 348/148, 149; 701/300, 701/301, 400, 408–411, 414, 418, 419
See application file for complete search history.

(56) References Cited

U.S. PATENT DOCUMENTS

| | | | | |
|---|---|---|---|---|
| 5,812,069 A * | 9/1998 | Albrecht | ............. | G08G 1/0104 340/905 |
| 6,654,681 B1 * | 11/2003 | Kiendl | ................... | G01C 21/26 340/905 |
| 7,825,824 B2 * | 11/2010 | Shrum, Jr. | ............. | G08G 1/127 340/506 |
| 8,416,300 B2 * | 4/2013 | Longobardi | ............ | G06T 11/00 340/500 |
| 2009/0309757 A1 * | 12/2009 | Mudalige | ................ | G08G 1/161 340/905 |
| 2010/0217455 A1 * | 8/2010 | Stahlin | .................... | G01C 21/32 701/1 |
| 2013/0282201 A1 * | 10/2013 | Kolodgie | ................. | G08G 1/20 701/2 |
| 2014/0062725 A1 * | 3/2014 | Maston | ................ | G08G 1/0112 340/905 |
| 2015/0039218 A1 * | 2/2015 | Bowers | ............. | B60W 30/0956 701/301 |
| 2015/0145995 A1 * | 5/2015 | Shahraray | ................. | B60R 1/00 348/148 |

(Continued)

*Primary Examiner* — Thomas Mullen
(74) *Attorney, Agent, or Firm* — Cantor Colburn LLP

(57) ABSTRACT

A method of a vehicle obtaining sensor data originating at one or more of other vehicles includes receiving input from an operator or system within the vehicle, and generating a request for the sensor data based on the input. The request specifies one or more parameters and the one or more parameters include a location at which the sensor data is obtained. The method also includes sending the request for the sensor data, receiving the sensor data, and processing the sensor data. The processing includes providing the sensor data to the operator or the system within the vehicle based on the input. A central server includes an interface to receive sensor data and parameters from one or more vehicles according to vehicle-to-network (V2N) communication. A processor generates a digital map from the sensor data. The digital map includes a layer for each type of the sensor data.

15 Claims, 4 Drawing Sheets

(56) References Cited

U.S. PATENT DOCUMENTS

| | | | |
|---|---|---|---|
| 2015/0187216 A1* | 7/2015 | Kwak | G08G 1/096725 |
| | | | 701/24 |
| 2015/0317901 A1* | 11/2015 | Hegemann | G08G 1/0112 |
| | | | 701/117 |
| 2016/0133130 A1* | 5/2016 | Grimm | H04L 67/22 |
| | | | 340/905 |
| 2016/0223343 A1* | 8/2016 | Averbuch | B60W 50/14 |
| 2016/0231746 A1* | 8/2016 | Hazelton | G05D 1/0212 |
| 2017/0115114 A1* | 4/2017 | Birken | G01B 11/2513 |
| 2017/0178498 A1* | 6/2017 | Mcerlean | G08G 1/0112 |

* cited by examiner

MULTI-VEHICLE SENSOR SHARING

INTRODUCTION

The subject invention relates to multi-vehicle sensor sharing.

Vehicles are increasingly equipped with sensors such as radar, lidar, and cameras that collect data regarding the environment surrounding the vehicle. The information obtained by the sensors can be used for a variety of applications such as, for example, driver warnings, collision avoidance, and automated driving. While each vehicle can use the sensor information that it collects, using additional information that was obtained outside the vehicle can enhance sensor-based applications. Accordingly, it is desirable to provide a vehicle with sensor information obtained by other vehicles.

SUMMARY

In one exemplary embodiment, a method of a vehicle obtaining sensor data originating at one or more of other vehicles includes receiving input from an operator or system within the vehicle, and generating a request for the sensor data based on the input. The request specifies one or more parameters and the one or more parameters include a location at which the sensor data is obtained. The method also includes sending the request for the sensor data, receiving the sensor data, and processing the sensor data. The processing the sensor data includes providing the sensor data to the operator or the system within the vehicle based on the input.

In addition to one or more of the features described herein, sending the request for the sensor data includes broadcasting the request via vehicle-to-vehicle (V2V) communication to the other vehicles.

In addition to one or more of the features described herein, the vehicle receives an acknowledgement from the one or more of the other vehicles. Each acknowledgment includes quality information.

In addition to one or more of the features described herein, the vehicle selects the one or more vehicles such that the receiving the sensor data is from the one or more vehicles.

In addition to one or more of the features described herein, sending the request for the sensor data includes sending the request to a central server that obtains the sensor data from the other vehicles.

In another exemplary embodiment, a system in a vehicle to obtain sensor data originating at other vehicles includes an interface to receive an input from an operator or system within the vehicle requesting the sensor data, receive sensor data based on a request for the sensor data, and provide the sensor data to the operator or the system. The system also includes a processor to generate the request for the sensor data based on the input. The request specifies one or more parameters and the one or more parameters include a location at which the sensor data is obtained.

In addition to one or more of the features described herein, the interface outputs a broadcast of the request to the other vehicles via vehicle-to-vehicle (V2V) communication.

In addition to one or more of the features described herein, the vehicle receives an acknowledgement from one or more of the other vehicles, each acknowledgement indicating quality information.

In addition to one or more of the features described herein, the processor selects one or more of the one or more vehicles and receives the sensor data from the one or more of the one or more vehicles.

In addition to one or more of the features described herein, the interface sends the request for the sensor data to a central server that obtains the sensor data from the other vehicles.

In yet another exemplary embodiment, a central server includes an interface to receive sensor data and one or more associated parameters from one or more vehicles according to vehicle-to-network (V2N) communication. The one or more associated parameters include a time stamp and location. The central server also includes a processor to generate a digital map from the sensor data, the digital map including a layer for each type of the sensor data. The type of the sensor data includes camera images.

In addition to one or more of the features described herein, the interface outputs a multicast of the digital map.

In addition to one or more of the features described herein, the interface receives a request from a requesting vehicle, the request including a location of interest.

In addition to one or more of the features described herein, the processor determines most relevant information based on the request and the digital map and sends the most relevant information to the requesting vehicle.

In addition to one or more of the features described herein, the processor determines the most relevant information based on the one or more associated parameters.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
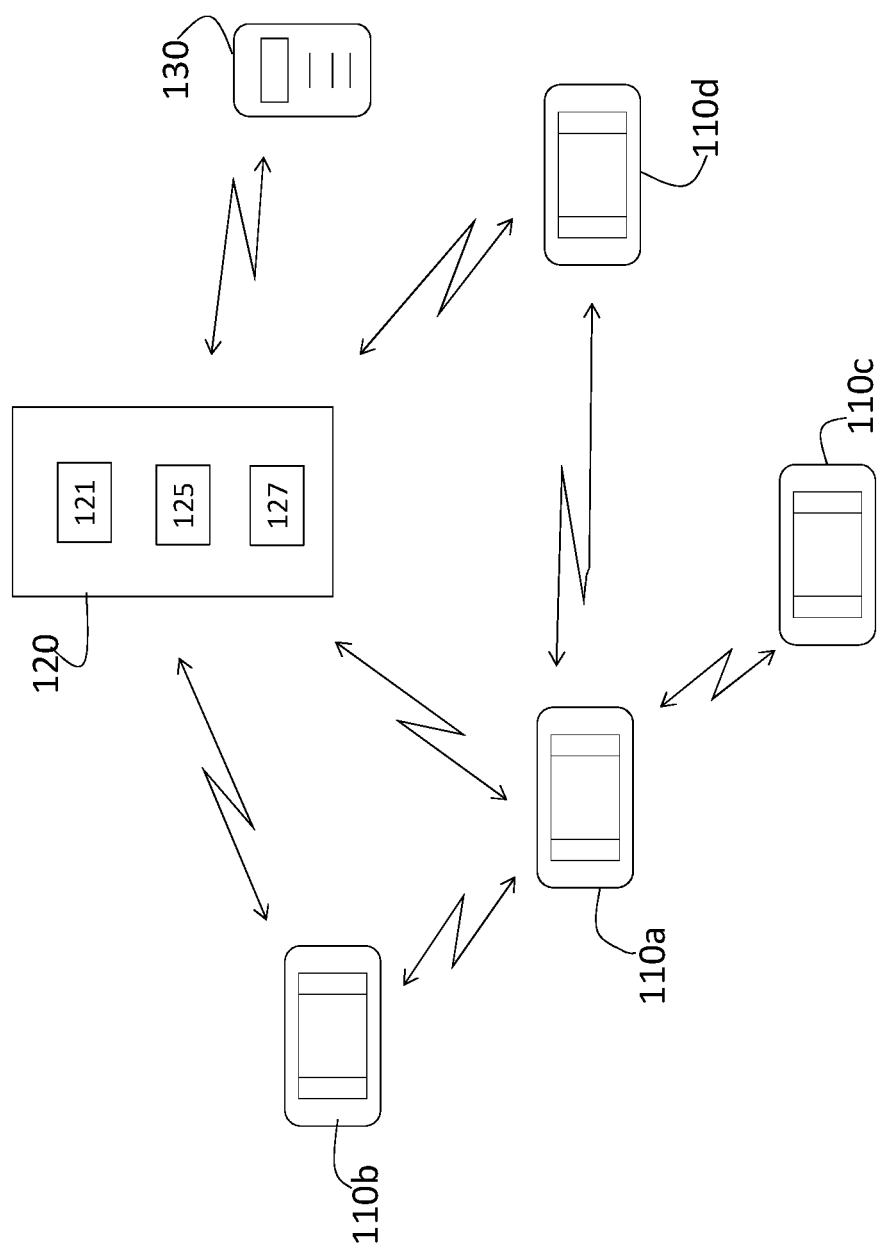
FIG. 1 illustrates vehicle-to-vehicle and vehicle-to-network communication according to one or more embodiments.

The following description is merely exemplary in nature and is not intended to limit the present disclosure, its application or uses. It should be understood that throughout the drawings, corresponding reference numerals indicate like or corresponding parts and features.

As previously noted, many vehicles are equipped with sensors such as, for example, radar, lidar, and cameras. Many vehicles are also equipped with communication components that facilitate telematics (i.e., communication of information with systems outside the vehicle). The communication can generally be referred to as vehicle-to-everything (V2X) communication. The general format for V2X messages includes an identifier of the message, a header that describes the data content, and the payload with the data content. Vehicle-to-vehicle (V2V) communication and vehicle-to-network (V2N) communication are two specific examples of V2X communication. One type of V2V message uses a dedicated short-range communication (DSRC) protocol. The DSRC protocol dictates the frequency, physical layer protocol, and other specifics of the message. V2V messages can also use the cellular network.

While vehicles can use data from their own sensors in warning systems, collision avoidance, and other applications, additional information obtained by sensors of other vehicles can enhance these applications. Embodiments of the systems and methods detailed herein relate to a vehicle obtaining sensor data from other vehicles based on V2V communication and obtaining sensor data from a central server (e.g., cloud-based server) based on V2N communication. The central server that obtains V2N messages from vehicles builds a digital map and provides information based on the digital map to a requesting vehicle.

In accordance with an exemplary embodiment of the invention, FIG. 1 illustrates V2V and V2N communication. In the exemplary arrangement, four vehicles 110a through 110d (referred to generally as 110) are shown. Three of the vehicles 110a, 110b, 110d communicate with a central server 120 based on V2N communication, and three of the vehicles 110b, 110c, 110d communicate with another vehicle 110a based on V2V communication. While only some of the communication that can take place among the components is shown in FIG. 1 for explanatory purposes, any of the vehicles 110 can communicate with each other and with the central server 120. That is, even though such communication is not shown, vehicles 110c and 110d may communication with each other and vehicle 110c may communicate with the central server 120. In the exemplary illustration, vehicle 110a is specifically discussed as the one that obtains information from sensors of the other vehicles 110b, 110c, 110d and from the digital map built by the central server 120. One or more other devices such as the mobile device 130 shown in FIG. 1 may communicate with the central server 120, as well.

The central server 120 includes processing circuitry that can include an application specific integrated circuit (ASIC), an electronic circuit, a processor 125 and memory 121 that executes one or more software or firmware programs, a combinational logic circuit, and/or other suitable components that provide the described functionality. Specifically, the ASIC or other processor 125 generates a digital map from data (e.g., sensor data) provided by one or more vehicles 110 or from other devices (e.g., mobile devices). The digital map includes location and orientation information in conjunction with data. The different sensors of the vehicles 110 provide different layers to the digital map. The central server 120 also includes an interface 127. The central server 120 receives sensor data from vehicles 110 through the interface 127 and also provides information based on the digital map to one or more vehicles via the interface 127. The central server 120 also communicates with other devices, such as mobile devices, through the interface 127. According to an exemplary embodiment, the central server 120 is a $5^{th}$ generation (5G) cloud-based server. The 5G network architecture provides lower latency (i.e., faster download and upload speeds) and higher capacity than previous wireless communication standards. In alternate embodiments, the central server 120 is a $4^{th}$ generation (4G) or other cellular or wireless network server.

Figure 2:
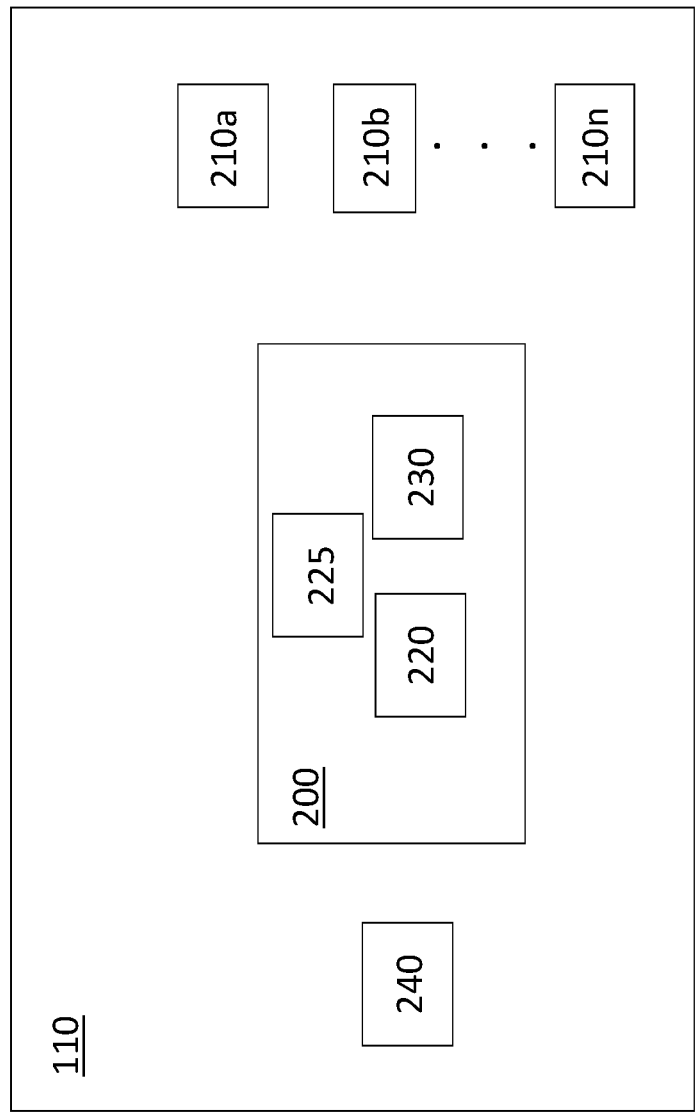
FIG. 2 details components of a vehicle according to one or more embodiments.

FIG. 2 details components of a vehicle 110 according to one or more embodiments. The components include a processing portion 200, one or more sensors 210a through 210n (generally referred to as 210), and a communication unit 240. The processing portion 200 includes at least one or more memory devices 220 and one or more processors 230 in addition to an interface to send and receive data. The communication unit 240 facilitates V2V communication with other vehicles 110 and V2N communication with the central server 120. The processing portion 200 can be associated with additional functionality of the vehicle 110 such as collision avoidance, automated operation, and the like. The communication unit 240 can facilitate intra-vehicle communication in addition to communication outside the vehicle based on V2X communication. For example, the communication unit 240 can output certain data (e.g., camera output) or warnings to a user display or other user interface within the vehicle 110. The communication unit 240 can also obtain input from an operator within the vehicle 110 (e.g., a request for a specific type of data). When the processing portion 200 is separate from and coupled to other vehicle 110 systems (e.g., collision avoidance), the interface 225 can facilitate requests for sensor data from the other systems and output of the requested data to the other systems within the vehicle 110.

The sensors 210 can include one or more cameras (e.g., still camera, video camera, infrared camera), a radar system, and a lidar system, for example. A given vehicle 110 can include only the processing portion 200 and only a subset or none of the sensors 210. For example, the vehicle 110a in FIG. 1 can include multiple sensors 210. In alternate embodiments, the vehicle 110a can include no sensors of its own and can rely on V2V communication with one or more other vehicles 110 or V2N communication with the central server 120, or both to obtain sensor information. This communication is further detailed with reference to FIGS. 3 and 4.

Figure 3:
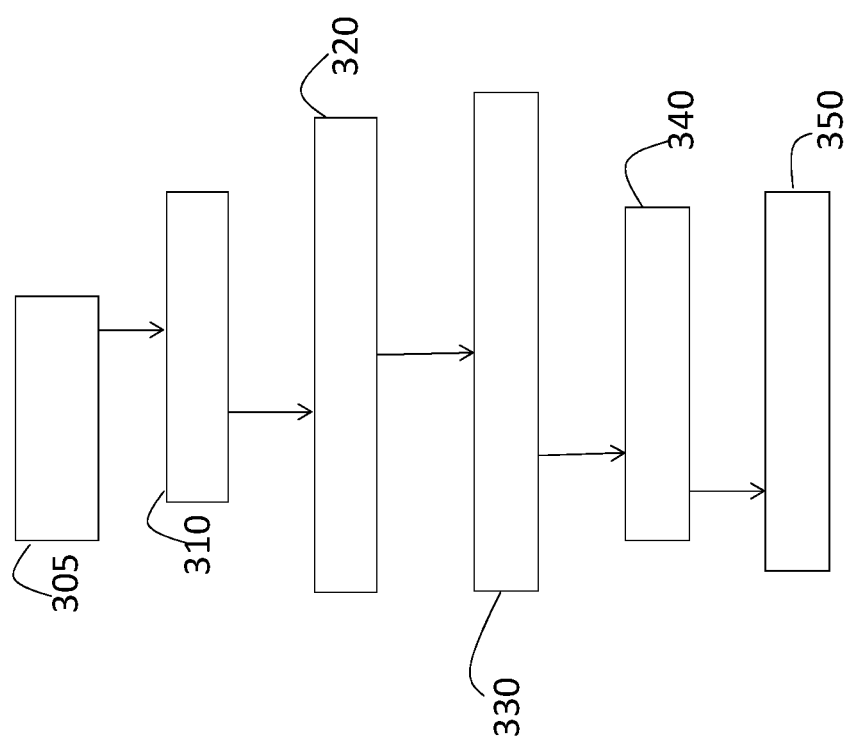
FIG. 3 is a process flow of a method of a vehicle obtaining sensor data from one or more other vehicles according to one or more embodiments.

FIG. 3 is a process flow of a method of a vehicle 110 obtaining sensor data from one or more other vehicles 110 according to one or more embodiments. The processes are discussed with reference to FIG. 1 for explanatory purposes. Thus, the processes are performed by vehicle 110a, for example. At block 305, the processes include receiving input specifying the sensor data of interest. The input can be an operator input or input from an application (e.g., collision avoidance, automatic operation) processed within or outside the processing portion 200. The process of receiving the input includes the processor 230 generating a query or request based on the input or inputs required by the operator or one or more applications. For example, if the input is a request for camera images for the current location of the vehicle 110a from an operator of the vehicle 110a, then the location and type of sensor 210 (i.e., camera) is specified in the query or request.

At block 310, the processes include the vehicle 110a broadcasting a query in a V2V message. The V2V message can use the DSRC protocol or a cellular network (e.g., 4G, 5G) without a base station or with a base station that routes the message using a frequency and timeslot assigned by the cellular network. The query can specify a type of sensor 210 (e.g., camera, radar) of interest to the vehicle 110a, a location (e.g., current or future location of the vehicle 110a, location of a point of interest), or other parameter. Receiving acknowledgements, at block 320, refers to the querying vehicle 110a receiving one or more replies from one or more vehicles 110, respectively, that have data relevant to the query by the vehicle 110a. The acknowledgment can be a V2V short notification message and can additionally provide a quality measurement of the data. In keeping with the general V2V format, the short notification message includes an identifier of the requesting vehicle 110*a* as the recipient of the message.

At block 330, the vehicle 110*a* selecting one or more vehicles 110 from which to receive data includes the vehicle 110*a* considering both the quality measurement of data associated with each vehicle 110 that provided an acknowledgement and the relevance of the data of each vehicle 110 that provided an acknowledgement to the initial query. The vehicle 110*a* can select every vehicle 110 that provided an acknowledgement or only one vehicle 110 or a subset of the vehicles 110. The selection by the vehicle 110*a* can be based on predefined rules, inputs by an operator in the vehicle 110*a*, or controllers in the vehicle 110*a* that have priorities associated with particular data. Obtaining sensor data, at block 340, includes the requesting vehicle 110*a* receiving data from the selected one or more vehicles 110 via V2V communication.

Processing the sensor data, at block 350, is accomplished in one or more ways that correspond with the way the request for sensor data was generated. For example, if an operator in the vehicle 110*a* requested images from a camera at a given location, the processing (at block 350) can include displaying the camera images. If the request (at block 310) was prompted by the collision avoidance system, as another example, the processing (at block 350) can include forwarding radar data obtained from one or more vehicles 110 at block 340 or further processing the radar data to generate an object list and corresponding locations to forward to the collision avoidance system. The object list indicates objects detected by the sensor 210 (e.g., radar, lidar) according to known target detection techniques.

Figure 4:
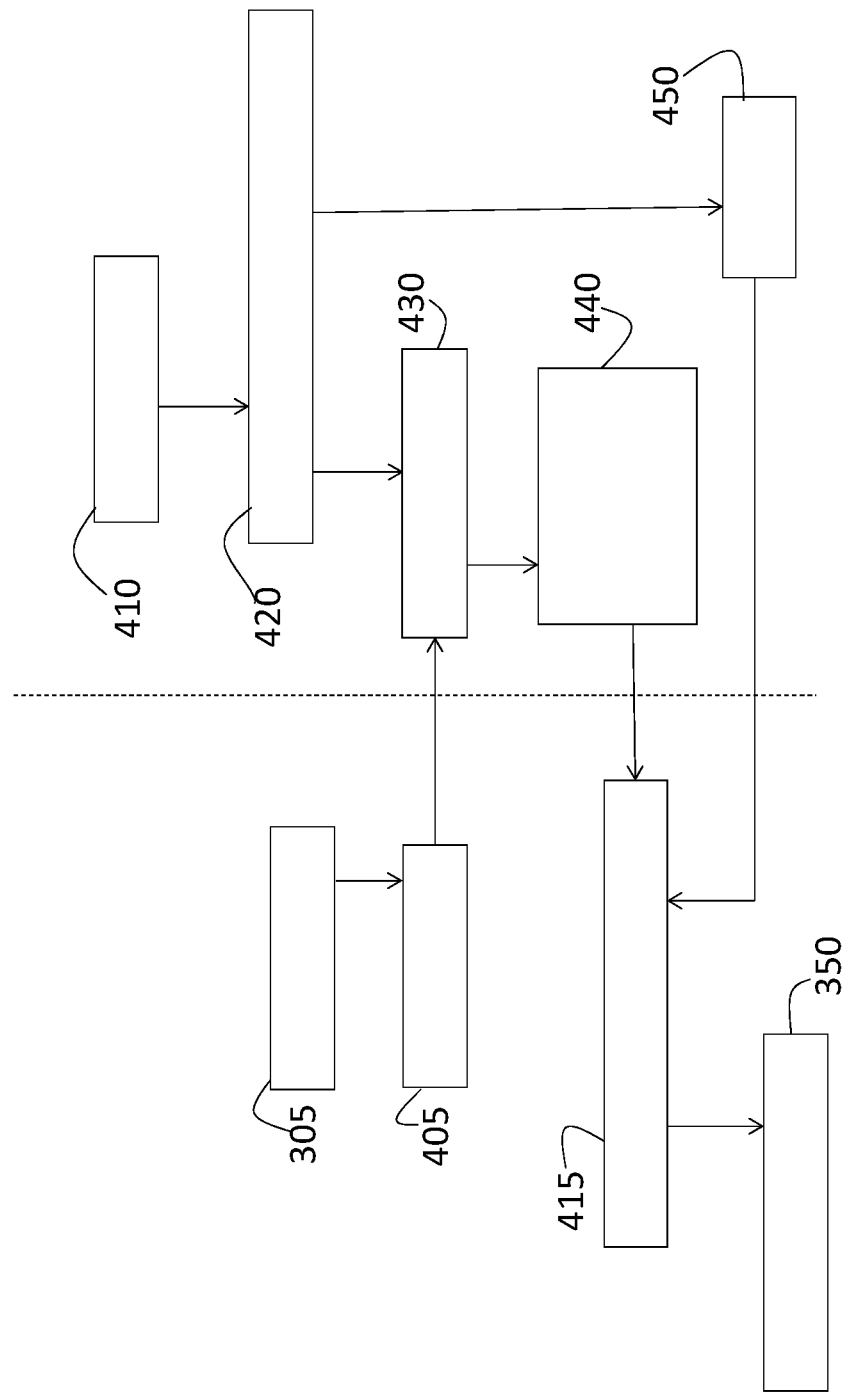
FIG. 4 shows processes performed by a requesting vehicle and the central server according to one or more embodiments.

FIG. 4 shows processes performed by a requesting vehicle 110*a* and the central server 120 according to one or more embodiments. The central server 120 performs the processes shown to the right of the dashed line and a requesting vehicle 110*a* performs the processes shown to the left of the dashed line in FIG. 4. At block 410, receiving data at the central server 120 is from one or more vehicles 110 that communicate with the central server 120 via V2N communication. The data can be sensor data requested by the central server 120 periodically or when the digital map is missing data in a given area or of a specific type of sensor 210, for example. The sensor data can also be provided automatically by the vehicles 110 and periodically or based on a specified trigger. The sensor data provided to the central server 120 can include a time stamp, location information, and other parameters related to the sensor data. In alternate embodiments, the post-processed sensor data can be provided to the central server 120 by one or more vehicles 110. This post-processed data indicates one or more objects and their corresponding locations. At block 410, receiving data can also include receiving data from other devices, such as, for example, mobile devices 130 that can be inside or outside a vehicle 110. The mobile devices 130 can include smart phones or tablets, for example.

Generating or updating a digital map, at block 420, refers to the central server 120 organizing the received data according to one or more parameters associated with the sensor data. The digital map is a layered collection of the data. For example, each layer at a given location can correspond with a different type of sensor 210. Updating the digital map can include adding to an existing map (e.g., when radar data is received for a location at which lidar data is already available, a layer is added to the existing digital map) or overwriting old data with more recent data. Some of the parameters associated with the sensor data include, for example, location, orientation, and time stamp. The processes can include the central server 120 multicasting the digital map, at block 450.

According to an alternate embodiment, the central server provides requested information in addition to or instead of multicasting (at block 450). According to this embodiment, the processes include a requesting vehicle 110*a* sending a request, at block 405. This request can be prompted by the vehicle 110*a* receiving input, at block 305, as previously discussed. This request can be generated within the requesting vehicle 110*a* by an operator or an application. The request can include location, orientation, time, and other parameters. For example, the vehicle 110*a* can request sensor data for a location at which it expects to be at some future time rather than where the vehicle 110*a* is currently. The orientation can specify the direction in which the vehicle 110*a* will be travelling. For example, if the vehicle 110*a* specifies an east-bound orientation, sensor information taken at a north-bound orientation that is part of the digital map can be deemed irrelevant or less relevant than sensor data from the east. More recent sensor data can be deemed more relevant than older sensor data, as well.

These determinations of relevance to the request from the vehicle 110*a* are part of processing the request, at block 430, and determining the most relevant information within the digital map, at block 440. The most relevant information from the digital map is sent to the requesting vehicle 110*a*. The vehicle 110*a* receiving sensor information, at block 415, refers to the vehicle 110*a* receiving this relevant information, as well as multicast data (at block 450), if it is sent. Once the sensor information is received (at block 415), processing sensor data from the central server 120, at block 350, is performed as previously discussed with reference to FIG. 3 for sensor data obtained from other vehicles 110. That is, the processing of sensor data is based on the impetus for the request (at block 405) and the type of data obtained (at block 415). For example, if the sensor information from the central server 120 already includes an object list and locations rather than raw radar data, this information may simply be forwarded to a requesting system or operator (e.g., collision avoidance, steering system, for display to an operator).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the description not be limited to the particular embodiments disclosed, but will include all embodiments falling within the scope of the application.

What is claimed is:

1. A method of a vehicle obtaining sensor data originating at one or more other vehicles, the method comprising:
receiving input from an operator or system within the vehicle;
generating a request for the sensor data based on the input, wherein the request specifies one or more parameters and the one or more parameters include a location at which the sensor data is obtained using one or more sensors at the one or more other vehicles;
sending the request for the sensor data;
receiving the sensor data; and processing the sensor data, wherein the processing the sensor data includes providing the sensor data to the operator or the system within the vehicle based on the input.

2. The method according to claim 1, wherein the sending the request for the sensor data includes broadcasting the request via vehicle-to-vehicle (V2V) communication to the one or more other vehicles.

3. The method according to claim 2, further comprising the vehicle receiving an acknowledgment from the one or more other vehicles, each acknowledgment including quality information.

4. The method according to claim 3, further comprising the vehicle selecting the one or more other vehicles such that the sensor data is received from the one or more other vehicles.

5. The method according to claim 1, wherein the sending the request for the sensor data includes sending the request to a central server that obtains the sensor data from the one or more other vehicles.

6. A system in a vehicle to obtain sensor data originating at other vehicles, the system comprising:
   an interface configured to receive an input from an operator or system within the vehicle requesting the sensor data, receive sensor data based on a request for the sensor data, and provide the sensor data to the operator or the system; and
   a processor configured to generate the request for the sensor data based on the input, wherein the request specifies one or more parameters and the one or more parameters include a location at which the sensor data is obtained and the sensor data is obtained using one or more sensors at the other vehicles.

7. The system according to claim 6, wherein the interface outputs a broadcast of the request to the other vehicles via vehicle-to-vehicle (V2V) communication.

8. The system according to claim 7, wherein the vehicle receives an acknowledgement from one or more of the other vehicles, each acknowledgement indicating quality information.

9. The system according to claim 8, wherein the processor selects one or more of the one or more of the other vehicles based on the quality information and receives the sensor data from the one or more of the one or more of the other vehicles.

10. The system according to claim 6, wherein the interface sends the request for the sensor data to a central server that obtains the sensor data from the other vehicles.

11. A central server, comprising:
    an interface configured to receive sensor data and one or more associated parameters from one or more vehicles according to vehicle-to-network (V2N) communication, wherein the one or more associated parameters include a time stamp and location;
    a processor configured to generate a digital map from the sensor data, the digital map including a layer for each type of the sensor data, wherein one of the layers of the sensor data includes camera images.

12. The central server according to claim 11, wherein the interface outputs a multicast of the digital map.

13. The central server according to claim 11, wherein the interface receives a request from a requesting vehicle, the request including a location of interest.

14. The central server according to claim 13, wherein the processor determines most relevant information based on the request and the digital map and sends the most relevant information to the requesting vehicle.

15. The central server according to claim 14, wherein the processor determines the most relevant information based on the one or more associated parameters.

* * * * *